(12) United States Patent
Sobotka et al.

(10) Patent No.: US 8,087,019 B1
(45) Date of Patent: Dec. 27, 2011

(54) SYSTEMS AND METHODS FOR PERFORMING MACHINE-IMPLEMENTED TASKS

(75) Inventors: David C. Sobotka, Redwood City, CA (US); Sudhir Tonse, Fremont, CA (US); Aftab Zia, Santa Clara, CA (US)

(73) Assignee: AOL Inc., Dulles, VA (US)

( * ) Notice: Subject to any disclaimer, the term of this patent is extended or adjusted under 35 U.S.C. 154(b) by 1219 days.

(21) Appl. No.: 11/555,102

(22) Filed: Oct. 31, 2006

(51) Int. Cl.
*G06F 9/46* (2006.01)
*G06Q 30/00* (2006.01)
*G06F 17/30* (2006.01)

(52) U.S. Cl. .................... 718/100; 705/14.4; 707/722
(58) Field of Classification Search .................. 718/100; 705/14.4; 707/722
See application file for complete search history.

(56) References Cited

U.S. PATENT DOCUMENTS

| | | | |
|---|---|---|---|
| 5,717,923 A | 2/1998 | Dedrick | |
| 5,796,952 A | 8/1998 | Davis et al. | |
| 5,819,259 A * | 10/1998 | Duke-Moran et al. | 1/1 |
| 5,909,670 A * | 6/1999 | Trader et al. | 705/14.68 |
| 5,918,014 A | 6/1999 | Robinson | |
| 5,948,061 A | 9/1999 | Merriman et al. | |
| 6,014,638 A | 1/2000 | Burge et al. | |
| 6,047,310 A | 4/2000 | Kamakura et al. | |
| 6,108,637 A | 8/2000 | Blumenau | |
| 6,144,944 A | 11/2000 | Kurtzman, II et al. | |
| 6,285,987 B1 | 9/2001 | Roth et al. | |
| 6,334,110 B1 | 12/2001 | Walter et al. | |
| 6,421,706 B1 | 7/2002 | McNeill et al. | |
| 6,487,538 B1 | 11/2002 | Gupta et al. | |
| 6,516,312 B1 | 2/2003 | Kraft et al. | |
| 6,666,766 B2 * | 12/2003 | Baerlocher et al. | 463/16 |
| 6,959,339 B1 | 10/2005 | Wu et al. | |
| 7,035,923 B1 | 4/2006 | Yoakum | |
| 7,039,599 B2 | 5/2006 | Merriman et al. | |
| 7,072,984 B1 | 7/2006 | Polonsky et al. | |
| 7,155,508 B1 | 12/2006 | Sankuratripati et al. | |
| 7,200,590 B2 | 4/2007 | Everett-Church et al. | |
| 7,353,267 B1 | 4/2008 | Cunningham et al. | |
| 7,440,968 B1 | 10/2008 | Oztekin et al. | |
| 7,676,602 B2 * | 3/2010 | Uzun et al. | 709/251 |
| 7,809,605 B2 | 10/2010 | Tonse et al. | |
| 2001/0036182 A1 | 11/2001 | Addante | |
| 2001/0054001 A1 | 12/2001 | Robinson | |
| 2002/0004733 A1 | 1/2002 | Addante | |
| 2002/0046099 A1 | 4/2002 | Frengut et al. | |
| 2002/0072984 A1 | 6/2002 | Rothman et al. | |
| 2002/0099600 A1 | 7/2002 | Merriman et al. | |
| 2003/0009385 A1 | 1/2003 | Tuciarone et al. | |
| 2003/0115187 A1 | 6/2003 | Bode et al. | |

(Continued)

OTHER PUBLICATIONS

*Banner Ad Rotator*; copyright 1997-2006; Downloaded on Jun. 7, 2006; 2 pages.

(Continued)

*Primary Examiner* — Meng An
*Assistant Examiner* — Mengyao Zhe
(74) *Attorney, Agent, or Firm* — Finnegan, Henderson, Farabow, Garrett & Dunner, LLP

(57) ABSTRACT

A task management system may be configured to select and/or perform one or more tasks. The task management system may be configured to create weighted groups of tasks to be performed in response to various triggering conditions. The task management system may include a value generation module, which may be configured to generate values used to select tasks from two or more of the weighted groups of tasks.

17 Claims, 4 Drawing Sheets

U.S. PATENT DOCUMENTS

| | | | |
|---|---|---|---|
| 2004/0123247 | A1 | 6/2004 | Wachen et al. |
| 2004/0186766 | A1 | 9/2004 | Fellenstein |
| 2004/0215607 | A1 | 10/2004 | Travis |
| 2005/0091106 | A1 | 4/2005 | Reller et al. |
| 2005/0149395 | A1 | 7/2005 | Henkin et al. |
| 2005/0149499 | A1 | 7/2005 | Franz et al. |
| 2005/0154718 | A1 | 7/2005 | Payne et al. |
| 2005/0187950 | A1 | 8/2005 | Parker et al. |
| 2005/0223000 | A1 | 10/2005 | Davis et al. |
| 2005/0240580 | A1 | 10/2005 | Zamir et al. |
| 2006/0026147 | A1 | 2/2006 | Cone et al. |
| 2006/0080321 | A1 | 4/2006 | Horn et al. |
| 2006/0136294 | A1 | 6/2006 | Linden et al. |
| 2006/0242139 | A1 | 10/2006 | Butterfield et al. |
| 2006/0242178 | A1 | 10/2006 | Butterfield et al. |
| 2006/0287980 | A1 | 12/2006 | Liu et al. |
| 2007/0083639 | A1 | 4/2007 | Gilbert et al. |
| 2007/0150341 | A1 | 6/2007 | Zia et al. |
| 2007/0150342 | A1 | 6/2007 | Law et al. |
| 2007/0150344 | A1 | 6/2007 | Sobotka et al. |
| 2007/0150345 | A1 | 6/2007 | Tonse et al. |
| 2007/0150347 | A1 | 6/2007 | Bhanidipati et al. |
| 2007/0150348 | A1 | 6/2007 | Hussain et al. |
| 2007/0151346 | A1 | 6/2007 | Sobotka et al. |
| 2007/0208751 | A1 | 9/2007 | Cowan et al. |
| 2007/0271340 | A1 | 11/2007 | Goodman et al. |
| 2008/0109406 | A1 | 5/2008 | Krishnasamy et al. |

OTHER PUBLICATIONS

*Banner Ad Script*; postings with various dates in Jul. 2005; Downloaded on Jun. 7, 2006; 18 pages.

*15 Seconds: Dynamic Banner Administration*; dated Feb. 20, 1998; Downloaded on Jun. 7, 2006; 4 pages.

*Dan's coding practice area, Standard Library Random Numbers*; dated Dec. 25, 2005; Downloaded on Jun. 7, 2006; 8 pages.

*An in-depth approach to a fair PHP ad randomizer*; postings with various dates in Dec. 2005 and Jan. 2006; Downloaded on Jun. 7, 2006; 7 pages.

*Code from Page 4 of 7 of An In-depth Approach to a Fair PHP Ad Randomizer*, Downloaded on Jun. 7, 2006; 1 page.

*Simple Ad Rotation Script*; copyright 2005-2006; Downloaded on Jun. 7, 2006; 2 pages.

USPTO, Office Action, U.S. Appl. No. 11/423,350, mailed Oct. 16, 2007.

USPTO, Final Office Action, U.S. Appl. No. 11/423,350, mailed May 2, 2008.

USPTO, Office Action, U.S. Appl. No. 11/423,350, mailed Nov. 13, 2008.

USPTO, Final Office Action, U.S. Appl. No. 11/423,350, mailed Jul. 21, 2009.

USPTO, Office Action, U.S. Appl. No. 11/391,086, mailed Aug. 17, 2009.

USPTO, Office Action, U.S. Appl. No. 11/390,713, mailed Sep. 3, 2009.

USPTO, Office Action, U.S. Appl. No. 11/391,088, mailed Oct. 1, 2009.

USPTO, Office Action, U.S. Appl. No. 11/390,651, mailed Oct. 1, 2009.

USPTO, Office Action, U.S. Appl. No. 11/394,252, mailed Oct. 2, 2009.

USPTO, Office Action, U.S. Appl. No. 11/390,868, mailed Oct. 15, 2009.

USPTO, Office Action, U.S. Appl. No. 11/391,019, mailed Nov. 12, 2009.

USPTO, Office Action, U.S. Appl. No. 11/390,766, mailed Aug. 31, 2009.

USPTO, Final Office Action, U.S. Appl. No. 11/391,086, mailed Feb. 3, 2010.

"Advertise your business on Google," Author Unknown, Date Unknown, [online] [retrieved on Oct. 18, 2006], 4 pgs. Retrieved from the Internet.

"Keyword Tool," Author Unknown, Date Unknown [online] [retrieved on Oct. 24, 2006], 1 pg. Retrieved from the Internet.

"Should Yahoo Own Social Search and Rank in a Web 2.0 World?" by Thomas Hawk, Oct. 30, 2006, [online] [retrieved on Nov. 1, 2006], 2 pgs. Retrieved from the Internet.

"Top 10 Search Results Guarantee," Author Unknown, Date Unknown, [online] [retrieved on Oct. 11, 2006], 2 pgs. Retrieved from the Internet.

"Targeting Search Ads by Demographics & Behavior," Author Unknown, Feb. 27, 2006, [online] [retrieved on Nov. 28, 2006], 5 pgs. Retrieved from the Internet: http://searchenginewatch.com/show/Page.html?page=sew_print&id=3593236.

"Targeting Search Ads by Demographics & Behavior," by Greg Jarboe, Mar. 22, 2006, [online] [retrieved on Oct. 12, 2006], 3 pgs. Retrieved from the Internet.

"Best Practices for Optimizing Web Advertising Effectiveness," by Rich E. Bruner, May 2006, DoubleClick, Inc. 14 pgs. [www.doubleclick.com].

"The Promise of Behavioral Targeting" by Bruce Clay, Aug. 24, 2006, [online] [retrieved on Oct. 12, 2006], 3 pgs. Retrieved from the Internet.

"Microsoft(R) adCenter Labs Presentation," Author Unknown, Jun. 11, 2006, [online] [retrieved on Dec. 6, 2006], 3 pgs. Retrieved from the Internet.

"The Web Bug FAQ," by Richard M. Smith, Nov. 11, 1999 [online] [retrieved on Oct. 18, 2006] 4 pgs.

"Software to Track E-Mail Raises Privacy Concerns," by Amy Harmon, Nov. 22, 2002 [online], [retrieved on Oct. 18, 2006], 9 pgs. Retrieved from the Internet.

"Technology Talk—Capturing Implied Response, a.k.a. Link Tracking," Author Unknown, May 2001 [online] [retrieved on Oct. 16, 2006], 2 pgs. Retrieved from the Internet.

"The Hunt for Stats Tracking Email and Clear Pixels," by Keith Boswell, the Marketleap Report vol. II, Issue #14—Part 2, Aug. 21, 2002, [online] [retrieved on Nov. 27, 2006], 4 pgs. Retrieved from the Internet.

"More on Email Privacy," by Preston Gralla, Jun. 8, 2004 [online] [retrieved on Oct. 18, 2006] 3 pgs. Retrieved from the Internet.

"Web Buggery: Analyzing Tracking Images," Author Unknown, Dec. 7, 2004 [online] [retrieved on Dec. 6, 2006] 7 pgs. Retrieved from the Internet.

Windows 2000 server as a router, Specialty Forums on Computing.net, question on how to set up a Windows 2000 Server as a router submitted Jul. 8, 2002 with instructions to do so in responses submitted Jul. 9, 2002.

"Powerseek PPC Plug-In Manual," Author Unknown, Nov. 19, 2004 [online] [retrieved on Dec. 6, 2006], 4 pgs., Retrieved from the Internet.

"Microsoft to Announce AdWords Competitor," by Chris Richardson, Mar. 15, 2005, [online] [retrieved on Oct. 18, 2006], 4 pgs. Retrieved from the Internet.

"New Ask Jeeves Sponsored Listings Program Lets More Advertisers Buy Direct," by Danny Sullivan, Aug. 1, 2005, [online] [retrieved on Oct. 18, 2006], 3 pgs. Retrieved from the Internet.

"Ask Jeeves' Sponsored Listings Portends Fragmentation of Search Marketing," by Charlene Li, Aug. 2, 2005 [online] [retrieved on Oct. 18, 2006] 4 pgs. Retrieved from the Internet.

"Allfeeds Google Backfill," Author Unknown, Aug. 24, 2005 [online] [retrieved on Oct. 18, 2006], 2 pgs. Retrieved from the Internet.

"A Nifty Personalized News Site," by JD Lasica, Jan. 14, 2004 [online] [retrieved on Nov. 27, 2006], 10 pgs. Retrieved from the Internet.

Home page for Findory.com, Nov. 2, 2004 [online] [retrieved on Dec. 6, 2006], 2 pgs. Retrieved from the Internet.

"About Findory," Nov. 2, 2004 [online] [retrieved on Dec. 6, 2006], 1 pg. Retrieved from the Internet.

"Unintrusive Customization Techniques for Web Advertising," by Marc Langheinrich, Atsuyoshi Nakamura, Naoki Abe, Tomonari Kamba, Yoshiyuki Koseki, Amsterdam, Netherlands 1999 [online] [retrieved on Oct. 12, 2006], 19 pgs. Retrieved from the Internet.

Bibliography for "Unintrusive Customization Techniques for Web Advertising," by Marc Langheinrich, Atsuyoshi Nakamura, Naoki Abe, Tomonari Kamba, Yoshiyuki Koseki, as found on [online] [retrieved on Oct. 12, 2006], 2 pgs.

"Multi-Service Search and Comparison Using the MetaCrawler," by Erik Selberg and Oren Etzioni, © 1993, 1994, Nikos Drakos, Computer Based Learning Unit, University of Leeds, translation initiated by Erik Selberg on Oct. 9, 19952, [online] [retrieved on Oct. 12, 2006], 16 pgs. Retrieved from the Internet.

Bibliography for "Multi-Service Search and Comparison Using the MetaCrawler," by Erik Selberg and Oren Etzioni, © 1993, 1994, Nikos Drakos, Computer Based Learning Unit, University of Leeds, as found on [online] [retrieved on Dec. 6, 2006], 2 pgs.

"Optimizing Search by Showing Results in Context," by Susan Dumais, Edward Cutrell, and Hao Chen, © 2001, published in SIGCHI' 01, Mar. 31-Apr. 14, 2001 2, 8 pgs.

Bibliography for "Optimizing Search by Showing Results in Context," by Susan Dumais, Edward Cutrell, and Hao Chen, © 2001, as found on [online] [retrieved on Dec. 6, 2006], 1 pg.

"New Site Layout Influences Results for Bankrate.com," by Mickey Alam Khan, Jul. 12,20042, [online] [retrieved on Nov. 27, 2006], 2 pgs. Retrieved from the Internet.

"Designing Web Ads Using Click-Through Data," by Jakob Nielsen, Sep. 2, 2001 2, [online] [retrieved on Oct. 12, 2006], 3 pgs. Retrieved from the Internet.

"The Science of Targeting," by Dawn Anfuso, Mar. 18,20042, [online] [retrieved on Oct. 12, 2006], 3 pgs. Retrieved from the Internet.

"Study Shows Target Demographics Important in Search Engine Marketing Campaigns," Author Unknown, May 18, 20042, [online] [retrieved on Oct. 12, 2006], 3 pgs. Retrieved from the Internet.

"Optimizing Paid Search Advertising," by Kevin Gold, Nov. 9,2004, [online] [retrieved on Oct. 12, 2006],2 pgs. Retrieved from the Internet.

"Search advertising glossary of terms," Author Unknown, Aug. 6, 2004, [online] [retrieved on Oct. 12, 2006],6 pgs. Retrieved from the Internet.

"MSN adCenter Joins Yahoo and Google in Search Advertising," by Greg Sterling, Mar. 17, 2005, [online] [retrieved on Oct. 12, 2006],3 pgs. Retrieved from the Internet.

"The Decade in Online Advertising 1994-2004," by Rick E. Bruner, Apr. 2005, DoubleClick, Inc., 11 pgs.

"Target Demographics, Before and After," by Rick E. Bruner and Kathryn Koegel, Jun. 2005, DoubleClick, Inc., 9 pgs.

"Search Engine Strategies 2005 Conference & Expo Agenda Monday, Dec. 5, 2005," Author Unknown, Oct. 28, 2005, [online] [retrieved on Dec. 6, 2006], 5 pgs. Retrieved from the Internet.

"Search Engine Strategies 2005 Conference & Expo Agenda Tuesday, Dec. 6,2005," Author Unknown, Oct. 28, 2005, [online] [retrieved on Dec. 6, 2006], 4 pgs. Retrieved from the Internet.

"Search Engine Strategies 2005 Conference & Expo Agenda Wednesday, Dec. 7, 2005," Author Unknown, Oct. 28, 2005, [online] [retrieved on Dec. 6, 2006],4 pgs. Retrieved from the Internet.

"Search Engine Strategies 2005 Conference & Expo Agenda Thursday, Dec. 8, 2005," Author Unknown, Oct. 28, 2005, [online] [retrieved on Dec. 6, 2006], 4 pgs. Retrieved from the Internet.

Internet Archive, Frequently Asked Questions: http://www.archive.org/aboutlfaqs.php; Dec. 6, 2006; 46 pages.

About Citeseer; Dec. 6, 2006; 2 pages.

* cited by examiner

SYSTEMS AND METHODS FOR PERFORMING MACHINE-IMPLEMENTED TASKS

BACKGROUND OF THE INVENTION

1. Field of the Invention

The present invention generally relates to performing machine-implemented tasks and, in particular, to performing computer-implemented tasks.

2. Background Technology

Computers and other types of machines may advantageously perform a variety of tasks. Exemplary computer-implemented tasks may relate to, for example, selecting advertisements to be displayed with search results provided by an web search engine, such as those provided by America Online, Google, Yahoo and the like. Unfortunately, some advertisement-selection systems may be unnecessarily complicated and/or inefficient.

SUMMARY

A need therefore exists for systems and methods that eliminate or reduce the disadvantages and problems listed above and/or other disadvantages and problems.

One aspect is a task management system may be configured to select and/or perform one or more tasks. The task management system may be configured to create weighted groups of tasks to be performed in response to various triggering conditions. The task management system may include a value generation module, which may be configured to generate values used to select tasks from two or more of the weighted groups of tasks.

Another aspect is a method for performing one or more tasks from a first weighted group of tasks in response to a first triggering condition and performing one or more tasks from a second weighted group of tasks in response to a different second triggering condition. The method may comprise creating first task group data indicating a first weighted group of tasks to be performed in response to a first triggering condition; and the first task group data may include first task data indicating a plurality of tasks associated with the first triggering condition, and first weight data associated with the first task data. The method may also comprise creating second task group data indicating a second weighted group of tasks to be performed in response to a different second triggering condition. The second task group data may include second task data indicating a plurality of tasks associated with the second triggering condition, and second weight data associated with the second task data. The method may also comprise incrementing a counter to a first incremented value and using the first incremented value and the first weight data to select a first portion of the first task data. The method may also comprise incrementing the counter to a second incremented value, and using the second incremented value and the second weight data to select a first portion of the second task data.

Yet another aspect is a system for performing one or more tasks from a first weighted group of tasks in response to a first triggering condition and performing one or more tasks from a second weighted group of tasks in response to a different second triggering condition. The system may comprise a task group data creation module configured to create first task group data and second task group data. The first task group data may indicate a first weighted group of tasks to be performed in response to a first triggering condition. The second task group data may indicate a second weighted group of tasks to be performed in response to a different second triggering condition. The first task group data may include first task data and first weight data. The first task data may indicate a plurality of tasks associated with the first triggering condition. The first weight data may be associated with the first task data. The second task group data may include second task data and second weight data. The second task data may indicate a plurality of tasks associated with the second triggering condition. The second weight data may be associated with the second task data. The system may also comprise a value generation module configured to generate a range of values, and each value within the range may have substantially the same chance of occurring. The system may also comprise a task selection module. The task selection module may be configured to use the first weight data and a first value from the range to select a first portion of the first task data. The task selection module may be configured to use the second weight data and a second value from the range to select a first portion of the second task data.

Still another aspect is a method that may comprise receiving a first advertisement from a system. The system may comprise a task group data creation module configured to create first task group data and second task group data. The first task group data may indicate a first weighted group of tasks to be performed in response to a first triggering condition. The second task group data may indicate a second weighted group of tasks to be performed in response to a different second triggering condition. The first task group data may include first task data and first weight data. The first task data may indicate a plurality of tasks associated with the first triggering condition. The first weight data may be associated with the first task data. The second task group data may include second task data and second weight data. The second task data may indicate a plurality of tasks associated with the second triggering condition. The second weight data may be associated with the second task data. The system may also include a value generation module configured to generate a range of values, and each value within the range may have substantially the same chance of occurring. The system may also include a task selection module. The task selection module may be configured to use the first weight data and a first value from the range to select a first portion of the first task data. The task selection module may be configured to use the second weight data and a second value from the range to select a first portion of the second task data. The system may also include a task performance module. The task performance module may be configured to use the first portion of the first task data to perform a first task. The task performance module may be configured to use the first portion of the second task data to perform a second task. The first triggering condition may comprise the receipt of at least one keyword. The first task may comprise sending at least one substitute keyword to an advertisement supplier configured to supply the first advertisement in response to receiving the at least one substitute keyword.

For purposes of summarizing the invention, certain aspects, advantages and features of certain embodiments of the invention have been described in this summary. Not necessarily all (or any of) these summarized aspects, advantages or features will be embodied in any particular embodiment of the invention. These summarized and/or other aspects, advantages or features of embodiments of the invention will become more fully apparent from the following detailed description and the appended claims.

BRIEF DESCRIPTION OF THE DRAWINGS

The appended drawings contain figures of preferred embodiments to further clarify the above and other aspects, advantages and features of the present invention. It will be appreciated that these drawings depict only preferred embodiments of the invention and are not intended to limits its scope. The invention will be described and explained with additional specificity and detail through the use of the accompanying drawings in which.

DETAILED DESCRIPTION

Embodiments of the present invention are generally directed towards performing computer-implemented tasks. The principles of the present invention, however, are not limited to performing computer-implemented tasks. It will be understood that, in light of the present disclosure, the embodiments disclosed herein can be successfully used in connection with other types of machine-implemented tasks. As used herein, "a task" is a broad term, and is used in its ordinary meaning, and includes, but is not limited to, one or more steps, processes, methods, and the like. For example, "a task" may refer to a method that includes one or more steps, and "a task" may refer to a subset of one or more steps of a larger method. As used herein, "a computer-implemented task" is a broad term, and is used in its ordinary meaning, and includes, but is not limited to, any task that may be performed by hardware modules, software modules, other suitable modules and/or any combination thereof.

Figure 1:
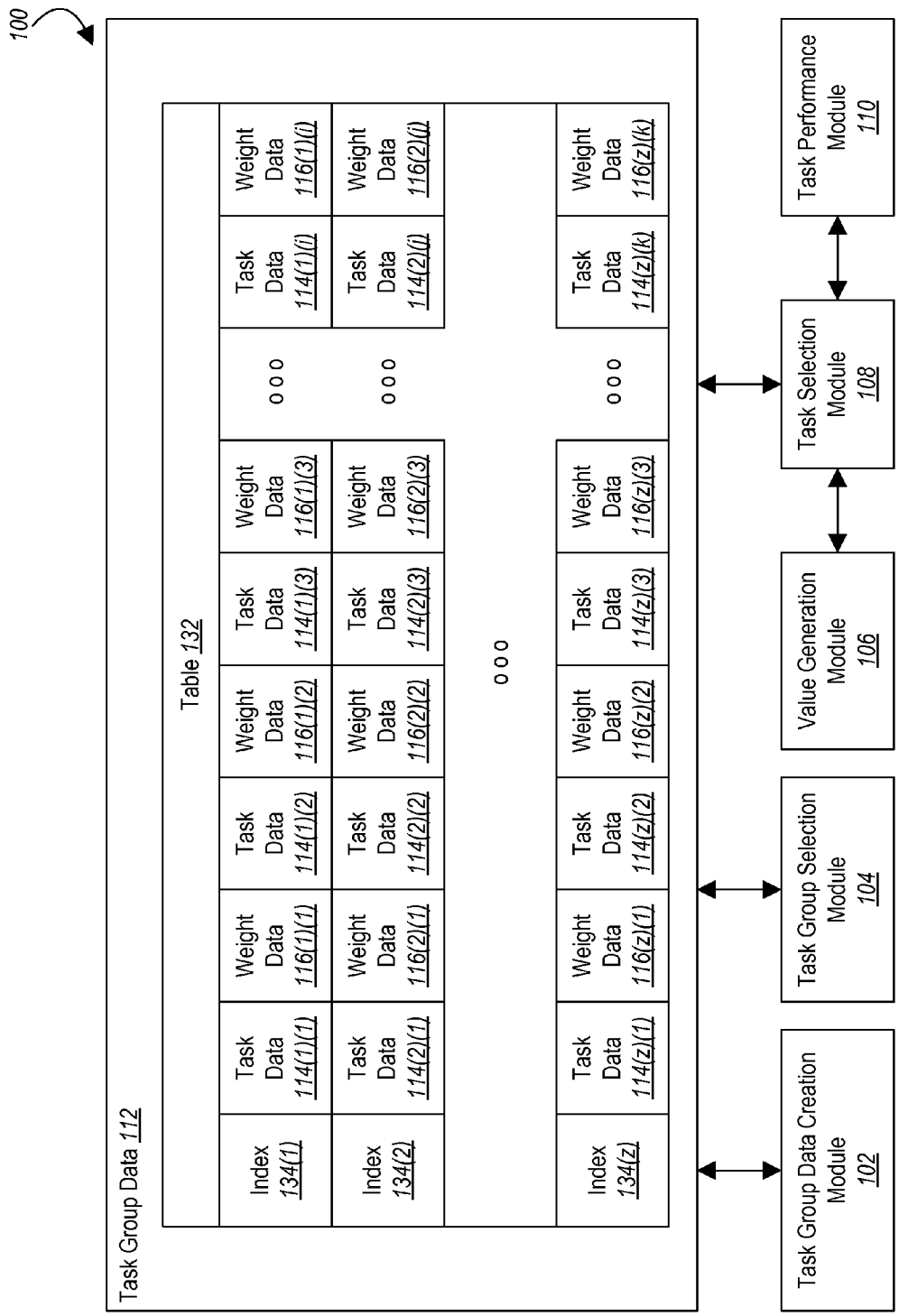
FIG. 1 is a block diagram of an exemplary embodiment of a task management system.

As shown in FIG. 1, a task management system 100 may be configured to perform one or more machine-implemented tasks, such as computer-implemented tasks. For example, the computer-implemented tasks may include sending one or more keywords to at least one advertisement supplier, which may then supply an advertisement in response to receiving the keywords. Also, for example, the computer-implemented tasks may include routing network traffic to different network-traffic-processing modules in order to test those network-traffic-processing modules. It will be appreciated, however, that the computer-implemented tasks are not limited to these examples and that the computer-implemented tasks may include other suitable computer-implemented tasks.

The task management system 100 is preferably configured to perform computer-implemented tasks according to weights associated with the computer-implemented tasks. For example, the task management system 100 may be configured to use the weights to affect which tasks the task management system 100 performs, and the task management system 100 may be configured to use the weights to affect how often the task management system 100 performs the tasks.

The task management system 100 may include a task group data creation module 102, a task group selection module 104, a value generation module 106, a task selection module 108, and a task performance module 110. The task management system 100 may also include one or more storage devices and task group data 112, which may be stored on the one or more storage devices. The task group data 112 may include task data 114 and weight data 116. The task data 114 preferably indicates a computer-implemented task, and the weight data 116 preferably indicates a weight that may be used to affect whether the computer-implemented task is performed and/or how often the computer-implemented task is performed. As discussed in further detail below, the task management system 100 may use the task group data 112 to affect which tasks the task management system 100 performs and/or to affect how often the task management system 100 performs the tasks.

As shown in FIGS. 2-5, the task group data creation module 102, the task group selection module 104, the value generation module 106, the task selection module 108, and the task performance module 110 preferably may perform some or all of a method 118; however, some or all of the method 118 may be performed by the task group data creation module 102; the task group selection module 104; the value generation module 106; the task selection module 108; the task performance module 110; one or more other suitable modules, systems, and the like; or any suitable combination of one or more thereof. Of course, the entire method 118 need not be performed; and any part or parts of the method 118 may be performed to provide a useful method 118.

Figure 2:
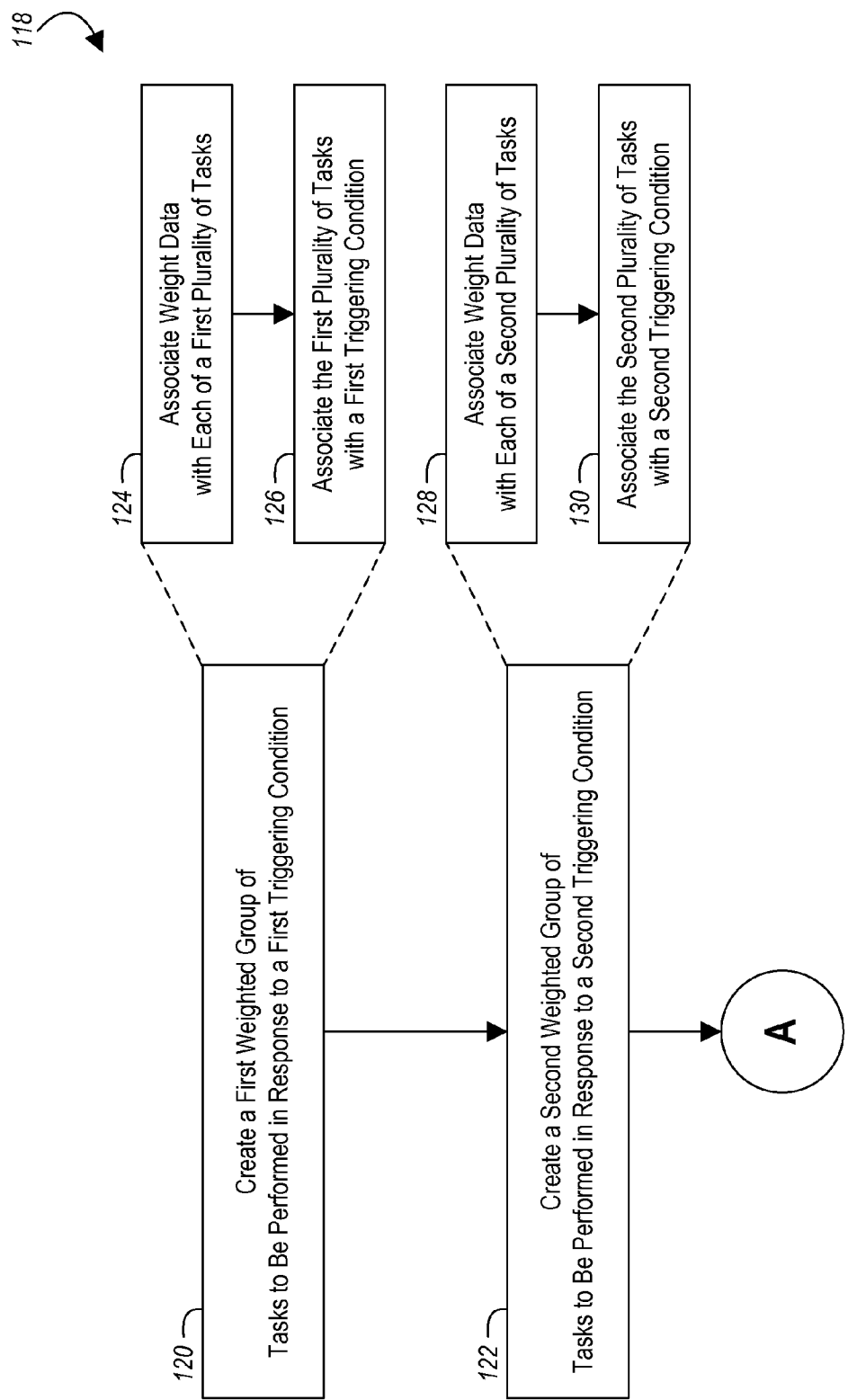
FIG. 2 is a flowchart illustrating a portion of an exemplary embodiment of a method.

As shown in FIG. 2, the task group data creation module 102 may, at a block 120, create a first weighted group of tasks to be performed in response to a first triggering condition and may, at a block 122, create a second weighted group of tasks to be performed in a response to a second triggering condition.

In one embodiment, a triggering condition may be the receipt of one or more keywords (such as those submitted to a search engine), and the weighted group of tasks to be performed in response to the triggering condition may include sending various substitute keywords to at least one advertisement supplier, which may then supply an advertisement in response to receiving the substitute keywords. Exemplary systems and methods for receiving keywords, sending various substituted keywords to advertisement suppliers, and supplying advertisements are disclosed in U.S. patent application Ser. No. 11/390,766, filed Mar. 28, 2006 and entitled DYNAMICALLY ALTERING REQUESTS TO INCREASE USER RESPONSE TO ADVERTISEMENTS, which is hereby incorporated by reference herein in its entirety.

In one embodiment, a triggering condition may be the receipt of network traffic, and the weighted group of tasks to be performed in response to the triggering condition may include routing network traffic to different network-traffic-processing modules in order to test those network-traffic-processing modules. For example, a triggering condition may be the receipt of one or more keywords (such as those submitted to a search engine), and the weighted group of tasks to be performed in response to the triggering condition may include (1) sending, a particular proportion of the time, the received keywords to at least one advertisement supplier and (2) sending, a particular proportion of the time, the received keywords to a routing system configured to send substitute keywords to the at least one advertisement supplier. Accordingly, a person may compare various statistics (such as, click-through rates) for the advertisements that an advertisement supplier provided in response to the originally received words and for the advertisements that the advertisement supplier provided in response to the substitute keywords. Desirably, the particular proportions of time that particular tasks are to be performed may be specified via user input using a user interface configured to receive such user input. Exemplary systems and methods for routing systems configured to send substitute keywords to advertisement suppliers are disclosed in U.S. patent application Ser. No. 11/390,766, filed Mar. 28, 2006 and entitled DYNAMICALLY ALTERING REQUESTS TO INCREASE USER RESPONSE TO ADVERTISEMENTS, which is hereby incorporated by reference herein in its entirety.

As shown in FIG. 2, the task group data creation module 102 may, at the block 120, create first task group data 112 indicating a first weighted group of tasks to be performed in response to a first triggering condition and may, at the block 122, create second task group data 112 indicating a second weighted group of tasks to be performed in a response to a second triggering condition. As shown in FIG. 2, the blocks 120, 122 may include one or more blocks. In particular, the block 120 may include blocks 124, 126, and the block 122 may include blocks 128, 130, discussed in further detail below.

At the block 124, the task group data creation module 102 may associate weight data 116 with each of a first plurality of tasks. For example, the task group data creation module 102 may create a task data 114 indicating a plurality of tasks [such as, task data 114(1)(1) to 114(1)(i) where i is the number of the tasks in the group], and the task group data creation module 112 may create weight data 116 [such as, weight data 116(1)(1) to 116(1)(i) where i is the number of the tasks in the group]. Accordingly, in this example, the task group data creation module 102 may associate the task data 114(1)(1) to 114(1)(i) with the weight data 116(1)(1) to 116(1)(i), respectively. As shown in FIG. 1, the task group data creation module 102 may associate the task data 114 with the weight data 116 using one or more tables or arrays 132.

At the block 126, the task group data creation module 102 may associate the first plurality of tasks with a first triggering condition. In one embodiment, at the block 126, the task group data creation module 102 may associate the first triggering condition with an index 134 that the task group data creation module 102 uses to store the tasks' task data 114 and/or weight data 116 within the table 132. In a further embodiment, at the block 126, the task group data creation module 102 may associate the first triggering condition with the index 134 by deriving the index 134 from the first triggering condition. For example, the first triggering condition may be the receipt of one or more keywords (such as those submitted to a search engine), and the task group data creation module 102 may apply hashing algorithm to at least a portion of the received keywords in order to generate the index 134.

At the block 128, the task group data creation module 102 may associate weight data 116 with each of a second plurality of tasks. At the block 130, the task group data creation module 102 may associate the second plurality of tasks with a second triggering condition. In one embodiment, at the block 130, the task group data creation module 102 may associate the second triggering condition with an index 134 that the task group data creation module 102 uses to store the tasks' task data 114 and/or weight data 116 within the table 132. In a further embodiment, at the block 130, the task group data creation module 102 may associate the second triggering condition with the index 134 by deriving the index 134 from the second triggering condition.

Thus, in some embodiments, the task group data creation module 102 may derive an index 134 from a triggering condition and may use that derived index 134 to store a task group's task data 114 and/or weight data 116 within the table 132. Consequently, when a triggering condition occurs, the task group data creation module 102 may derive an index 134 and may use the derived index 134 to access the table 132 to determine whether the table 132 already includes task data 114 and/or weight data 116 associated with the triggering condition. If the table 132 does not already include task data 114 and/or weight data 116 associated with the triggering condition, the task group data creation module 102 may create that task data 114 and/or weight data 116 and may store it in the table 132 using that derived index 134. After the table 132 includes task data 114 and/or weight data 116 associated with the triggering condition, the task management system 100 may use the task data 114 and/or weight data 116 associated with the triggering condition to affect which tasks the task management system 100 performs in response to the triggering condition and/or to affect how often the task management system 100 performs the tasks.

It will be appreciated that the task management system 100 does not require the table 132 and that the task group data creation module 102 may associate the task data 114 with the weight data 116 using one or more tables, arrays, pointers, objects, data structures, databases, any other suitable means, or any combination thereof. It will also be appreciated that the task group data creation module 102 may associate a triggering condition with the task data 114 and/or weight data 116 of a plurality of tasks using one or more tables, arrays, pointers, objects, data structures, databases, any other suitable means, or any combination thereof.

Figure 3:
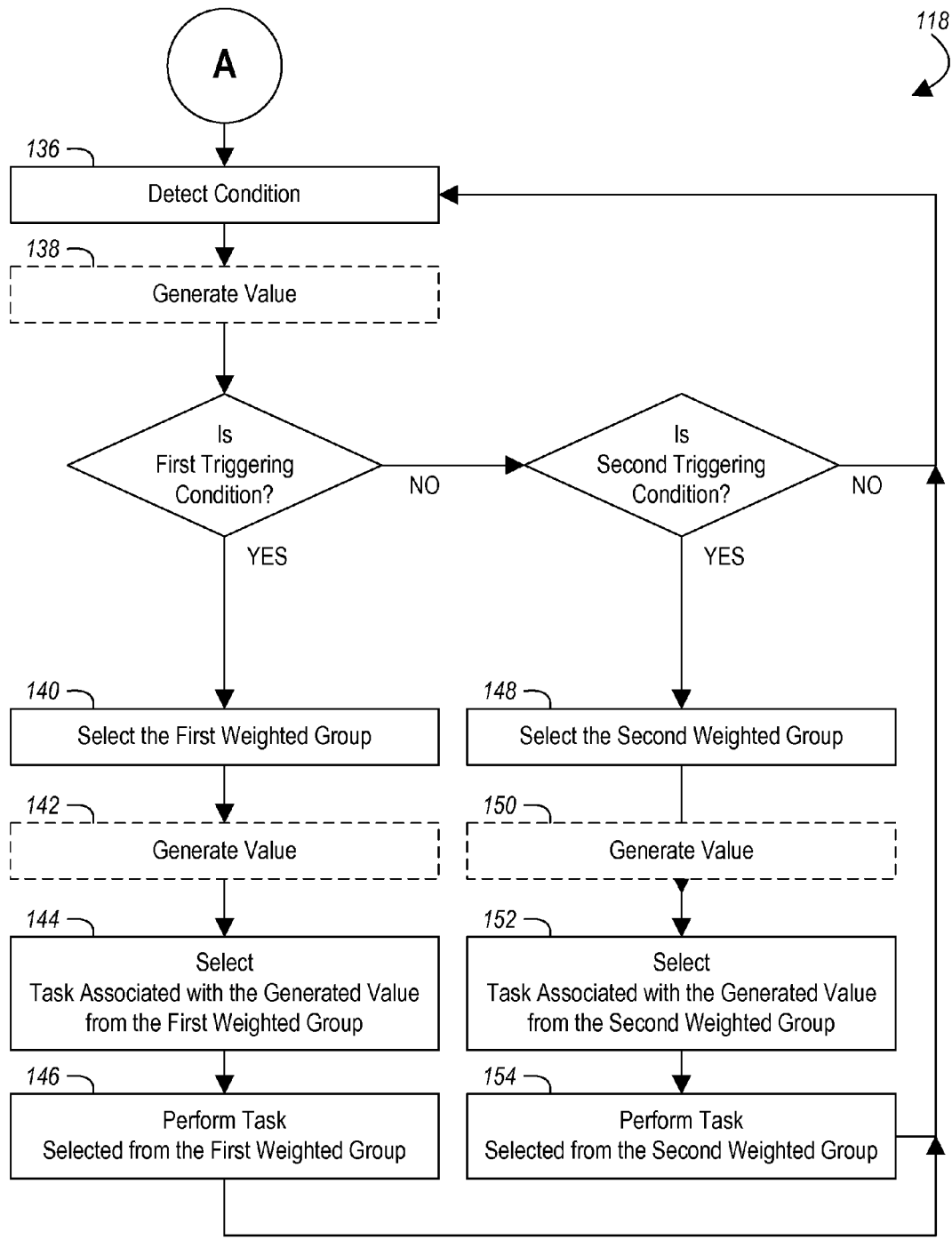
FIG. 3 is a flowchart illustrating another portion of the method shown in FIG. 2.

As shown in FIGS. 2-3, the method 118 may further include one or more additional blocks (such as blocks 136, 138, 140, 142, 144, 146, 148, 150, 152, 154), and the method 118 may proceed from the block 122 to the block 136.

At the block 136, the task group selection module 104 may detect a condition. At a block 138, the value generation module 106 may generate a value that the task selection module 108 may use in selecting a task at the blocks 144, 152, which is discussed in further detail below. The value generation module 106, however, need not generate this value at the block 138 and may, for example, generate the value at the blocks 142, 150.

When the condition detected at the block 136 is the first triggering condition, the method 118 may proceed from the block 138 to the block 140. When the condition detected at the block 136 is the second triggering condition, the method 118 may proceed from the block 138 to the block 148. When the condition detected at the block 136 is neither the first or second triggering condition, the method 118 may return to the block 136 to continue detecting conditions.

At the block 140, the task group selection module 104 may select the first weighted group of tasks created at the block 120 (FIG. 2). At the block 142, the value generation module 106 may generate a value when, for example, the value generation module 106 did not generate the value at the block 138. At the block 144, the task selection module 108 may select a task that is from the first weighted group of tasks and that is associated with the value generated at the block 138 or 142; and the task performance module 110 may perform the selected task at the block 146. The method 118 may return from the block 146 to the block 136 to continue detecting conditions. Likewise, at the block 148, the task group selection module 104 may select the second weighted group of tasks created at the block 122 (FIG. 2). At the block 150, the value generation module 106 may generate a value when, for example, the value generation module 106 did not generate the value at the block 138. At the block 152, the task selection module 108 may select a task that is from the second weighted group of tasks and that is associated with the value generated at the block 138 or 150; and the task performance module 110 may perform the selected task at the block 154. The method 118 may return to from the block 154 to the block 136 to continue detecting conditions.

In further detail, in one embodiment, at the block 140, the task group selection module 104 may derive an index 134 from the first condition and may use the derived index 134 to select and access a portion of the table 132 that includes task data 114 and/or weight data 116 for the tasks in the first weighted group of tasks. In this embodiment, at the block 144, the task selection module 108 may compare the generated value with weight data 116 selected at the block 140 in order to identify task data 114 that is associated with the generated value, and the task performance module 110 may use the identified task data 114 in performing a task at the block 146. Likewise, at the block 148, the task group selection module 104 may derive an index 134 from the second condition and may use the derived index 134 to select and access a portion of the table 132 that includes task data 114 and/or weight data 116 for the tasks in the second weighted group of tasks. Accordingly, at the block 152, the task selection module 108 may compare the generated value with weight data 116 selected at the block 148 in order to identify task data 114 that is associated with the generated value, and the task performance module 110 may use the identified task data 114 in performing a task at the block 154.

In some embodiments, the task data 114 may indicate at least one substitute keyword. For example, the task data 114 may comprise at least one substitute keyword, which may be associated with a triggering condition and a triggering condition may be the receipt of one or more keywords (such as those submitted to a search engine). Desirably, a weighted group of tasks to be performed in response to the triggering condition may include sending various substitute keywords to at least one advertisement supplier, which may then supply an advertisement in response to receiving the substitute keywords. The task data 114 may indicate at least one substitute keyword, for example, by including the at least one substitute keyword, by including a reference for accessing the at least one substitute keyword, or by any other suitable means for indicating the at least one substitute keyword.

Figure 4:
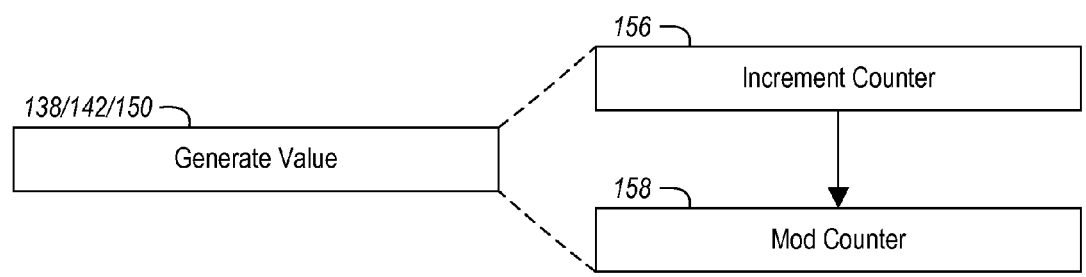
FIG. 4 is a flowchart illustrating an exemplary embodiment of a portion of the method shown in FIG. 3.
Figure 5:
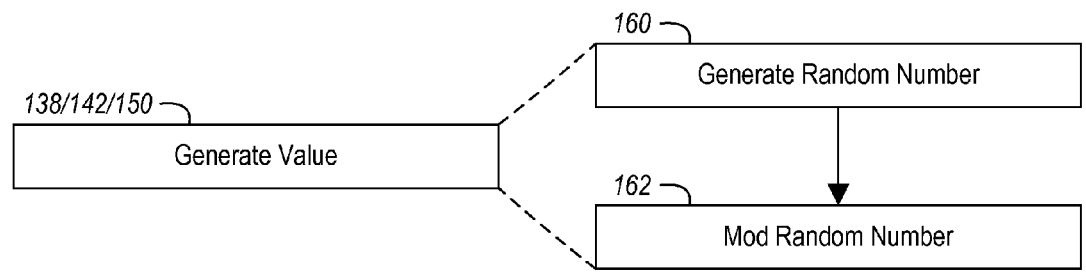
FIG. 5 is a flowchart illustrating an exemplary embodiment of a portion of the method shown in FIG. 3.

As shown in FIG. 4, the value generation module 106 may generate the value at the block 138, the block 142, or the block 150 by incrementing a counter at the block 156 and performing a MOD operation on the counter to generate the value at the block 158. As shown in FIG. 5, the value generation module 106 may generate the value at the block 138, the block 142, or the block 150 by generating a random number at the block 160 and performing a MOD operation on the counter to generate the value at the block 162.

In further detail, the MOD operation at the blocks 158, 162 may comprise "v=q MOD m" where v is the generated value; where q is an incremented counter (from block 156) or a random number (from block 160); and where m is the value used to MOD q. Because the MOD operation returns the remainder of q divided by m, v will fall within the range of 0 through m-1, which range is predetermined by selecting the value for m. For example, v will fall within the predetermined range of 0 through 99 where m=100; the predetermined range of 0 through 999 where m=1000; the predetermined range of 0 through 49 where m=50; etc. Of course, any other suitable value for v or for m may be used.

The values from the predetermined range may form at least a part of the weight data 116 associated with the task data 114, which may affect which tasks the task performance module 110 performs in response to a triggering condition. For instance, in a first example in which a task group includes three tasks and where m=100, values 0-9 may be associated with a first task, values 10-29 may be associated with a second task, and values 30-99 may be associated with a third task. In this first example, the task selection module 108 may select (and the task performance module 110 may perform) the first task when the value generation module 106 generates a value that is within 0-9, the second task when the value generation module 106 generates a value that is within 10-29, and the third task when the value generation module 106 generates a value that is within 30-99. Also, in a second example in which a task group includes two tasks and where m=100, values 0-24 and 50-74 may be associated with a first task, and values 25-49 and 75-99 may be associated with a second task. In this second example, the task selection module 108 may select (and the task performance module 110 may perform) the first task when the value generation module 106 generates a value that is within 0-24 or within 50-74, and the second task when the value generation module 106 generates a value that is within 25-49 or within 75-99.

The values from the predetermined range may form at least a part of the weight data 116 associated with the task data 114, which may also affect how often the performance module 110 performs tasks in response to a triggering condition. In particular, the incrementing at the block 156 and the random number generation at the block 160 are preferably configured to produce a substantially uniform distribution of values. Consequently, the MOD operation at the blocks 158, 162 may be used to convert that substantially uniform distribution of values into a predetermined, substantially uniform range of values in which each value within the predetermined range has substantially the same chance of occurring. With each value within the predetermined range having substantially the same chance of occurring, the amount of values associated with a task may determine how often that task is performed—thus providing a weight for the task. For instance, in a first example in which a task group includes three tasks and where m=100, values 0-14 may be associated with a first task, values 15-29 may be associated with a second task, and values 30-99 may be associated with a third task. Thus, in this first example, fifteen of the hundred values are associated with the first task, fifteen of the hundred values are associated with the second task, and seventy of the hundred values are associated with the third task. Consequently, in this first example, the task selection module 108 may select (and the task performance module 110 may perform) the first task about 15% of the time a triggering condition occurs, the second task about 15% of the time the triggering condition occurs, and the third task about 70% of the time the triggering condition occurs. Also, in a second example in which a task group includes two tasks and where m=100, values 0-24 and 50-74 may be associated with a first task, and values 25-49 and 75-99 may be associated with a second task. Thus, in this second example, fifty of the hundred values are associated with the first task, and fifty of the hundred values are associated with the second task. Consequently, in this second example, the task selection module 108 may select (and the task performance module 110 may perform) the first task about 50% of the time a triggering condition occurs and the second task about 50% of the time the triggering condition occurs.

If desired, some or all of the tasks may be associated with an equal amount of values; however, some or all of the tasks may be associated with different amounts of values. Further, a task may be associated with a single value (e.g., "9" or the like) or a plurality of values (e.g., "0-9" or the like). In addition, a task may be associated with a single continuous range of values (e.g., "0, 1, 2, 3, and 4" or the like)—which may make facilitate quickly comparison with a generated value. However, a task may be associated with a plurality of values some or all of which are discontinuous (e.g., "1, 3, 5, and 7" or "1, 2, 3, and 5" or "8, 9, 10, 21, and 22" or the like). In fact, the values from the predetermined range of values may be associated with tasks in any suitable fashion.

In some embodiments, when the value generation module 106 generates the value at the block 138, 142 or 150, the value generation module 106 may advantageously use an individual counter (for example, at block 156) or an individual random number generator (for example, at block 160) for multiple weighted task groups, such as the first and second weighted task groups created at the blocks 120, 122. Advantageously, this may help avoid dedicating the system resources necessary to create and maintain several different counters or random number generators (which could be a significant burden in systems with, for example, thousands of weighted task groups). Moreover, this may be useful when the triggering conditions recur at random times. For instance, when the value generation module 106 uses an individual counter to generate the value at the block 138, 142, or 150, the value may advantageously be random for purposes of selecting a task from a weighted task group. In particular, even though the counter may be incremented by a fixed amount (such as, by 1) at the block 156, the value may be random because the triggering condition for that weighted task group recurs at random times.

As discussed above, the task management system 100 may use the task group data creation module 102, the task group selection module 104, the value generation module 106, the task selection module 108, and/or the task performance module 110 in performing various methods. It will be appreciated, however, that the task management system 100 does not require the task group data creation module 102, the task group selection module 104, the value generation module 106, the task selection module 108, or the task performance module 110. It will also be appreciated that the task management system 100 may include more modules or fewer modules and that some or all of the modules may be implemented in a single device or multiple devices depending, for example, upon the particular configuration of the task management system 100.

As used herein, "storage device" is a broad term and is used in its ordinary meaning and includes, but is not limited to, a hard disk drive, a tape drive, a redundant array of independent disks (RAID), a floppy disk, a CD-ROM or other optical disk, magnetic disk storage, memory, flash memory, nonvolatile memory (such as, memory with data that remains intact when the power is removed), volatile memory (such as, memory with data that is lost when the power is removed), random access memory (RAM), RAM cache, RAM made using complementary metal oxide semiconductor technology (CMOS RAM), read-only memory (ROM), programmable read-only memory (PROM), erasable programmable read-only memory (EPROM), electrically erasable programmable read-only memory (EEPROM), any other suitable computer-readable medium, any combination thereof, and the like.

Exemplary Architecture

The methods and systems described above can be implemented using software, hardware, or both hardware and software. A module may include the software, the hardware, or both—including software components, object-oriented software components, class components and task components, processes, functions, attributes, procedures, subroutines, segments of program code, drivers, firmware, microcode, circuitry, data, databases, data structures, tables, arrays, variables, field programmable gate arrays (FPGAs), application-specific integrated circuits (ASICs), controllers, computers, and firmware—to implement those methods and systems described above. The functionality provided for in the software, hardware, or both may be combined into fewer components or further separated into additional components. Additionally, the components may advantageously be implemented to execute on one or more devices.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The methods and systems described above require no particular component or function. Thus, any described component or function—despite its advantages—is optional. Also, some or all of the described components and functions may be used in connection with any number of other suitable components and functions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing one or more tasks from a first group of weighted tasks in response to a first triggering condition and performing one or more tasks from a second group of weighted tasks in response to a different second triggering condition, the method comprising:
    creating first task group data indicating a first group of weighted tasks to be performed in response to a first triggering condition, the first task group data including:
        first task data indicating a plurality of tasks associated with the first triggering condition; and
        first weight data associated with the first task data, the first weight data indicating a weight for each of the plurality of tasks associated with the first triggering condition;

creating second task group data indicating a second group of weighted tasks to be performed in response to a different second triggering condition, the second task group data including:
    second task data indicating a plurality of tasks associated with the second triggering condition; and
    second weight data associated with the second task data, the second weight data indicating a weight for each of the plurality of tasks associated with the different second triggering condition;
incrementing a counter to a first incremented value;
in response to a first occurrence of the first triggering condition:
    using the first incremented value and the first weight data, which indicates a weight for each of the plurality of tasks associated with the first triggering condition, to select a first portion of the first task data; and
    using the selected first portion of the first task data to perform a first task of the plurality of tasks associated with the first triggering condition;
incrementing the counter to a second incremented value; and
in response to a first occurrence of the different second triggering condition:
    using the second incremented value and the second weight data, which indicates a weight for each of the plurality of tasks associated with the different second triggering condition, to select a first portion of the second task data; and
    using the selected first portion of the second task data to perform a first task of the plurality of tasks associated with the different second triggering condition.

2. The method as in claim 1, wherein the first triggering condition comprises a receipt of at least one keyword; and wherein the first task comprises sending at least one substitute keyword to an advertisement supplier configured to supply an advertisement in response to receiving the at least one substitute keyword.

3. The method as in claim 2, wherein the first task data indicates the at least one substitute keyword.

4. The method as in claim 1, further comprising:
incrementing the counter to a third incremented value;
in response to a second occurrence of the first triggering condition:
    using the third incremented value and the first weight data, which indicates a weight for each of the plurality of tasks associated with the first triggering condition, to select a second portion of the first task data; and
    using the selected second portion of the first task data to perform a second task of the plurality of tasks associated with the first triggering condition;
incrementing the counter to a fourth incremented value; and
in response to a second occurrence of the different second triggering condition:
    using the fourth incremented value and the second weight data, which indicates a weight for each of the plurality of tasks associated with the different second triggering condition, to select a second portion of the second task data; and
    using the selected second portion of the second task data to perform a second task of the plurality of tasks associated with the different second triggering condition.

5. The method as in claim 4, wherein the first triggering condition comprises a receipt of at least one keyword; wherein the first task comprises sending the at least one keyword to an advertisement supplier configured to supply an advertisement in response to receiving the at least one keyword; and wherein the third task comprises sending at least one substitute keyword to the advertisement supplier.

6. The method as in claim 1, wherein the first triggering condition recurs randomly; and wherein the second triggering condition recurs randomly.

7. A system for performing one or more tasks from a first group of weighted tasks in response to a first triggering condition and performing one or more tasks from a second group of weighted tasks in response to a different second triggering condition, the system comprising:
    one or more computer-readable storage media having stored thereon:
        a task group data creation module configured to create first task group data and second task group data; the first task group data indicating a first group of weighted tasks to be performed in response to a first triggering condition; the second task group data indicating a second group of weighted tasks to be performed in response to a different second triggering condition; the first task group data including first task data and first weight data; the first task data indicating a plurality of tasks associated with the first triggering condition; the first weight data being associated with the first task data, the first weight data indicating a weight for each of the plurality of tasks associated with the first triggering condition, wherein the weights for the plurality of tasks associated with the first triggering condition are based on a first set of numerical values; the second task group data including second task data and second weight data; the second task data indicating a plurality of tasks associated with the second triggering condition; the second weight data being associated with the second task data, the second weight data indicating a weight for each of the plurality of tasks associated with the different second triggering condition, wherein the weights for the plurality of tasks associated with the different second triggering condition are based on a second set of numerical values;
        a value generation module configured to generate a range of values by incrementing a counter;
        a task selection module;
            the task selection module being configured to, in response to a first occurrence of the first triggering condition:
                apply a MOD operation to a first generated value from the range to obtain a value within the first set of numerical values; and
                use the first weight data and the obtained value within the first set of numerical values to select a first portion of the first task data;
            the task selection module being configured to, in response to a first occurrence of the different second triggering condition:
                applying a MOD operation to a second generated value from the range to obtain a value within the second set of numerical values; and
                use the second weight data and the obtained value within the second set of numerical values to select a first portion of the second task data.

8. The system as in claim 7, further comprising a task performance module; the task performance module being configured to use the first portion of the first task data to perform a first task; the task performance module being configured to use the first portion of the second task data to perform a second task.

9. The system as in claim 8, wherein the first triggering condition comprises the receipt of at least one keyword; and wherein the first task comprises sending at least one substitute keyword to an advertisement supplier configured to supply an advertisement in response to receiving the at least one substitute keyword.

10. The system as in claim 9, wherein the first task data indicates the at least one substitute keyword.

11. The system as in claim 7, wherein the first triggering condition recurs randomly; and wherein the second triggering condition recurs randomly.

12. A method comprising:
receiving a first advertisement from a system, the system comprising:
a task group data creation module configured to create first task group data and second task group data; the first task group data indicating a first group of weighted tasks to be performed in response to a first triggering condition; the second task group data indicating a second group of weighted tasks to be performed in response to a different second triggering condition; the first task group data including first task data and first weight data; the first task data indicating a plurality of tasks associated with the first triggering condition; the first weight data being associated with the first task data, the first weight data indicating a weight for each of the plurality of tasks associated with the first triggering condition, wherein the weights for the plurality of tasks associated with the first triggering condition are based on a first set of numerical values; the second task group data including second task data and second weight data; the second task data indicating a plurality of tasks associated with the second triggering condition; the second weight data being associated with the second task data, the second weight data indicating a weight for each of the plurality of tasks associated with the different second triggering condition, wherein the weights for the plurality of tasks associated with the different second triggering condition are based on a second set of numerical values;
a value generation module configured to generate a range of values by incrementing a counter;
a task selection module;
the task selection module being configured to, in response to a first occurrence of the first triggering condition:
apply a MOD operation to a first generated value from the range to obtain a value within the first set of numerical values; and
use the first weight data and the obtained value within the first set of numerical values to select a first portion of the first task data;
the task selection module being configured to, in response to a first occurrence of the different second triggering condition:
applying a MOD operation to a second generated value from the range to obtain a value within the second set of numerical values; and
use the second weight data and the obtained value within the second set of numerical values to select a first portion of the second task data; and
a task performance module; the task performance module being configured to use the first portion of the first task data to perform a first task; the task performance module being configured to use the first portion of the second task data to perform a second task; the first triggering condition comprising the receipt of at least one keyword; the first task comprising sending at least one substitute keyword to an advertisement supplier configured to supply the first advertisement in response to receiving the at least one substitute keyword.

13. The method as in claim 1, wherein the first triggering condition comprises a receipt of a first keyword;
wherein the plurality of tasks associated with the first triggering condition includes a plurality of keyword substitutions for the received first keyword;
wherein the second triggering condition comprises a receipt of a second keyword, which is different from the first keyword; and
wherein the plurality of tasks associated with the second triggering condition includes a plurality of keyword substitutions for the received second keyword.

14. The method as in claim 1, wherein the weights for the plurality of tasks associated with the first triggering condition are based on a first set of numerical values; and wherein the act of using the first incremented value and the first weight data to select the first portion of the first task data comprises:
applying a MOD operation to the first incremented value to obtain a value within the first set of numerical values; and
using the first weight data and the obtained value within the first set of numerical values to select the first portion of the first task data; and
wherein the weights for the plurality of tasks associated with the second triggering condition are based on a second set of numerical values; and wherein the act of using the second incremented value and the second weight data to select the first portion of the second task data comprises:
applying a MOD operation to the second incremented value to obtain a value within the second set of numerical values; and
using the second weight data and the obtained value within the second set of numerical values to select the first portion of the second task data.

15. The method as in claim 1, wherein the first triggering condition comprises a receipt of a first set of one or more keywords; and wherein the second triggering condition comprises a receipt of a different second set of one or more keywords.

16. The system as in claim 7, wherein the first triggering condition comprises a receipt of a first set of one or more keywords; and wherein the second triggering condition comprises a receipt of a different second set of one or more keywords.

17. The method as in claim 12, wherein the first triggering condition comprises a receipt of a first set of one or more keywords; and wherein the second triggering condition comprises a receipt of a different second set of one or more keywords.

* * * * *